(12) United States Patent  (10) Patent No.: US 9,126,696 B1
Hampel et al.  (45) Date of Patent: Sep. 8, 2015

(54) METHOD AND SYSTEM FOR OBTAINING AND PRESENTING TURBULENCE DATA VIA COMMUNICATION DEVICES LOCATED ON AIRPLANES

(71) Applicant: Yamasee Ltd., Ra'anana (IL)

(72) Inventors: Oran Hampel, Aseret (IL); Zivi Nedivi, Tel Aviv (IL); Moshe Shitrit, Ra'anana (IL)

(73) Assignee: Yamasee Ltd., Ra'anana (IL)

( * ) Notice: Subject to any disclaimer, the term of this patent is extended or adjusted under 35 U.S.C. 154(b) by 0 days.

(21) Appl. No.: 14/615,034

(22) Filed: Feb. 5, 2015

(51) Int. Cl.
*B64D 45/00* (2006.01)
*B64D 43/00* (2006.01)
*G08G 5/00* (2006.01)

(52) U.S. Cl.
CPC .............. *B64D 45/00* (2013.01); *B64D 43/00* (2013.01); *G08G 5/0091* (2013.01)

(58) Field of Classification Search
CPC ....... B64D 45/00; B64D 43/00; G08G 5/0091
See application file for complete search history.

(56) References Cited

U.S. PATENT DOCUMENTS

| 6,285,878 | B1 * | 9/2001 | Lai ................................. 455/431 |
| 6,810,527 | B1 * | 10/2004 | Conrad et al. .................. 725/76 |
| 6,813,493 | B2 * | 11/2004 | Criqui et al. ................... 455/431 |
| 6,889,042 | B2 * | 5/2005 | Rousseau et al. .............. 455/431 |
| 7,489,992 | B2 * | 2/2009 | Valette et al. ................. 701/34.3 |
| 7,612,688 | B1 | 11/2009 | Vigeant-Langlois et al. |
| 7,917,255 | B1 * | 3/2011 | Finley ................................ 701/9 |
| 8,094,605 | B2 * | 1/2012 | Lynch et al. .................. 370/316 |
| 8,130,121 | B2 * | 3/2012 | Smith et al. ................... 340/945 |
| 8,131,407 | B1 * | 3/2012 | Robinson .......................... 701/3 |
| 8,131,408 | B2 * | 3/2012 | Kordt ................................. 701/3 |
| 8,159,369 | B1 * | 4/2012 | Koenigs et al. ................ 340/963 |
| 8,629,788 | B1 * | 1/2014 | Greenleaf et al. ............. 340/968 |
| 8,907,817 | B1 * | 12/2014 | Finley et al. ................... 340/968 |
| 2006/0040612 | A1 * | 2/2006 | Min ............................. 455/12.1 |
| 2006/0121893 | A1 * | 6/2006 | Tillotson et al. .............. 455/431 |
| 2006/0238384 | A1 * | 10/2006 | Hess et al. ................ 340/995.14 |
| 2008/0154446 | A1 * | 6/2008 | Rui et al. .......................... 701/3 |
| 2008/0255714 | A1 * | 10/2008 | Ross ................................ 701/14 |
| 2009/0286550 | A1 * | 11/2009 | Weinroth .................... 455/456.1 |
| 2012/0010806 | A1 * | 1/2012 | Tseng ............................ 701/201 |

(Continued)

OTHER PUBLICATIONS

"WSI Total Turbulence" archived from http://www.wsi.com/products-aviation-commercial-wsi-totalturbulence.htm on Feb. 2, 2015.

(Continued)

*Primary Examiner* — Helal A Algahaim
*Assistant Examiner* — Kelly D Williams
(74) *Attorney, Agent, or Firm* — Pearl Cohen Zedek Latzer Baratz LLP

(57) ABSTRACT

A method, device and system is provided for obtaining and processing turbulence data via communication devices located on-board airplanes. Turbulence data obtained by a plurality of communication devices may be received during flights on-board respective ones of a plurality of airplanes. Accumulated tempo-spatial turbulence information may be generated by super-positioning the turbulence data received from the plurality of communication devices onto a single tempo-spatial frame of reference. The accumulated tempo-spatial turbulence data information may be distributed to one or more of the communication devices. The plurality of communication devices may include one or more hand-held user communication device and/or embedded airplane communication device.

28 Claims, 8 Drawing Sheets

(56) References Cited

U.S. PATENT DOCUMENTS

| | | | |
|---|---|---|---|
| 2013/0126679 A1* | 5/2013 | Estkowski et al. | 244/190 |
| 2013/0158751 A1* | 6/2013 | Cornell et al. | 701/14 |
| 2014/0074326 A1* | 3/2014 | Pereira | 701/14 |
| 2014/0106333 A1* | 4/2014 | Dugan | 434/428 |
| 2014/0201191 A1* | 7/2014 | Karmarkar | 707/722 |

OTHER PUBLICATIONS

"WSI Total Turbulence Overview" Oct. 2014.

* cited by examiner

METHOD AND SYSTEM FOR OBTAINING AND PRESENTING TURBULENCE DATA VIA COMMUNICATION DEVICES LOCATED ON AIRPLANES

FIELD OF THE INVENTION

Embodiments of the present invention relate generally to the field of crowdsourcing, and more particularly to obtaining turbulence data along flight routes via communication devices.

BACKGROUND OF THE INVENTION

Prior to setting forth the background of the invention, it may be helpful to set forth definitions of certain terms that will be used hereinafter.

The term "turbulence" as used herein refers to a rapid variation of pressure and flow velocity in space and time that affect airplanes during flights. Turbulence affects the comfort of the passengers of the flight and may also affect the safety of the flight. Additionally, turbulence may affect the fuel consumption of the airplane. Clear-air turbulence (CAT) is the turbulent movement of air masses in the absence of any visual cues such as clouds, and is caused when bodies of air moving at widely different speeds meet. Therefore, CAT events are significantly more difficult to detect.

The term "communication device" as used herein refers to any electronic device that is provided with the ability to both transmit and receive data, usually but not exclusively, over a communication network. Communication devices may include user equipment (UE) such as hand-held mobile devices that are not integral to and may be carried onto and off of an airplane including, for example, smartphones, tablet personal computers (PCs), and laptop PCs. User equipment (UE) may be operated for example by a pilot, flight crew member or a passenger, for example, releasable secured to a dashboard mount in the cockpit so that the user equipment has a generally fixed position relative to the airplane. Additionally or alternatively, communication devices may be part of embedded airplane communication systems that are embedded in, inseparably mounted to, or integral to, airplane devices. Embedded airplane communication devices may include, for example, transmitter-responders (transponders), such as mode C transponders or mode S transponders, or Universal Access Transceivers (UATs). Communication devices may include or may be operatively connected to one or more turbulence sensor(s), communication circuit(s) including antenna(e), memor(ies), processor(s), and display(s), any combination of which may be integrated into one housing as a single device, or may be separated into different devices. Data may be transmitted between the user equipment, embedded airplane communication devices, satellites, ground communication devices, or any combination thereof over one or more wireless networks including, for example, radio, satellite, Wi-Fi (e.g. IEEE 802.11 family), cellular such as 3G or long term evolution (LTE), or any combination thereof.

FIG. 1 is a map diagram illustrating turbulence data obtained by forecast models. Map 10 shows areas that are likely to be affected by turbulence. The darker pattern indicates a likelihood of a relatively severe level of turbulence, whereas the lighter pattern indicates a likelihood of a relatively moderate level of turbulence. The data derived from the forecast models may be regularly updated and is typically based on mathematical models. The data may be generated for different timeslots and altitude ranges so that a flight route may be planned and amended accordingly.

These maps are generated via forecast models generally based on weather conditions, but suffer from severe inaccuracies due to the inability to correctly estimate the effect of the various weather conditions on turbulence. First, not all clouds lead to turbulence, and second, various conditions such as clear-air turbulence (CAT) cannot be accurately forecasted. Therefore, currently available solutions for obtaining and presenting turbulence data tend to suffer both from 'no detection' scenarios and 'false alarm' scenarios which generally undermine the reliability of turbulence monitoring.

SUMMARY OF EMBODIMENTS OF THE INVENTION

Embodiments of the present invention provide a device, system and method for obtaining and processing turbulence data via communication devices located on-board airplanes. Turbulence data obtained by a plurality of communication devices may be received during flights on-board respective ones of a plurality of airplanes. Accumulated tempo-spatial turbulence information may be generated by super-positioning the turbulence data received from the plurality of communication devices onto a single tempo-spatial frame of reference. The accumulated tempo-spatial turbulence data information may be distributed to one or more of the communication devices.

Embodiments of the present invention provide a device, system and method for obtaining turbulence data by a communication device during a flight on-board an airplane. The turbulence data from the communication devices may be transmitted to a remote location. Accumulated tempo-spatial turbulence information may be received that is generated at the remote location by super-positioning the turbulence data received from the communication device with turbulence data received from one or more other communication devices during flights on-board other airplanes onto a single tempo-spatial frame of reference. The accumulated tempo-spatial turbulence information associated with regions surrounding the airplane of the communication device and the other airplanes may be displayed.

The system may use a distribution server connected to the plurality of communication devices over a common communication network. The communication devices thus serve both as sources of the turbulence data and also as the recipients of the accumulated turbulence data. The plurality of communication devices may include one or more hand-held user communication device and/or embedded airplane communication device.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
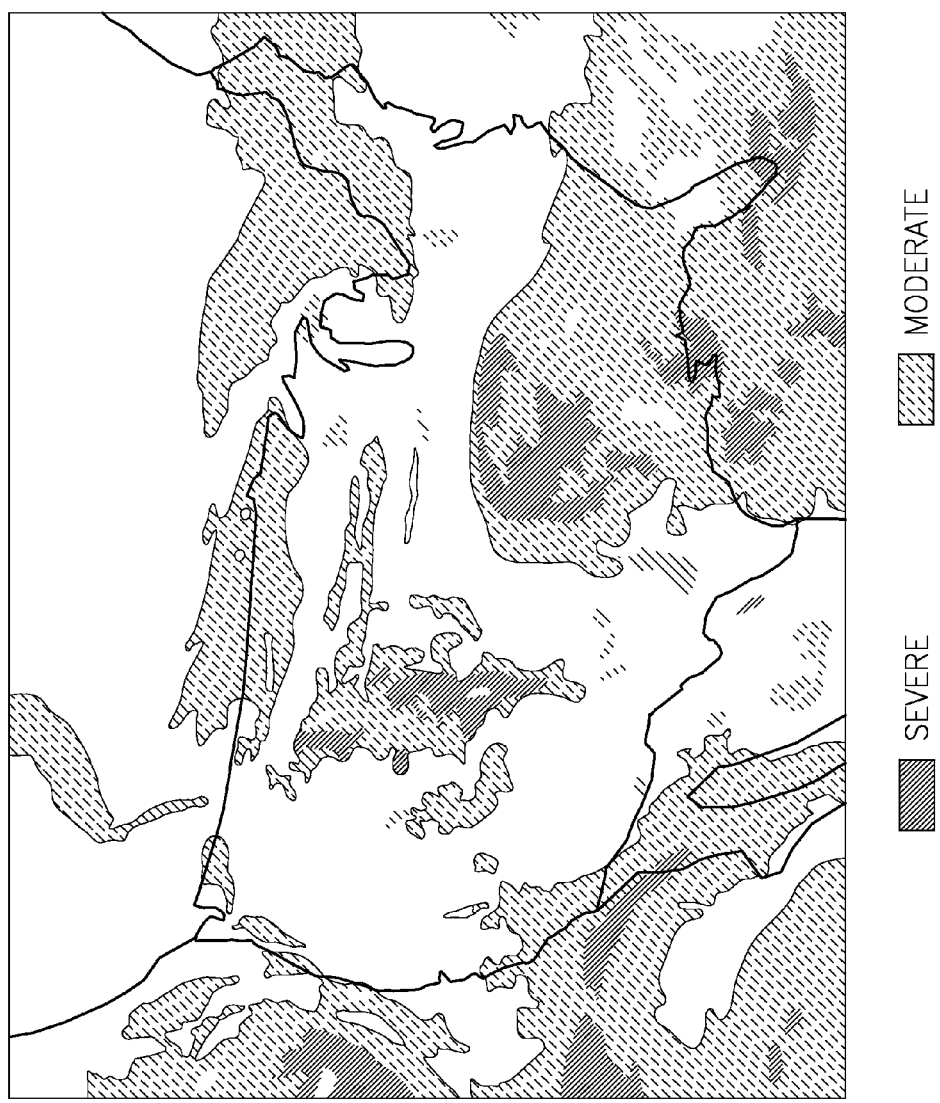
FIG. 1 is a map diagram illustrating turbulence data obtained by forecast models.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

Figure 2:
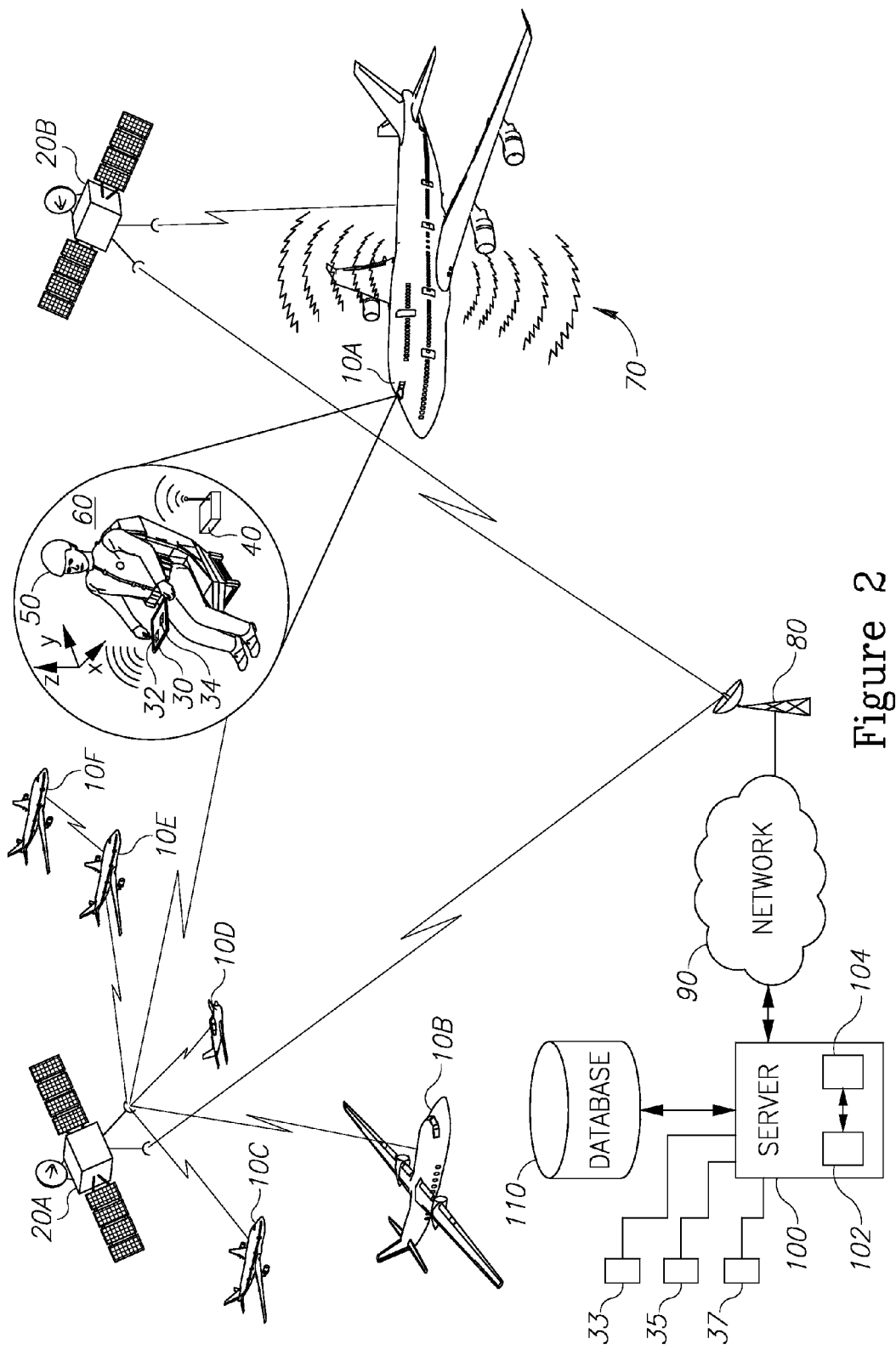
FIG. 2 is a schematic illustration of a system for monitoring turbulence data in accordance with embodiments of the present invention.

FIG. 2 is a schematic illustration of a system for monitoring turbulence data in accordance with embodiments of the present invention. The system may include a plurality of communication devices 30 located respectively on a plurality of airplanes 10A-10F and configured to obtain and transmit turbulence data relating to turbulence 70 affecting the respective airplanes 10A-10F over a communication channel. Communication devices 30 may include or be operatively connected to a sensor or detector such as an accelerometer for collecting and recording turbulence data, a communication circuit having an antenna for communicating with other devices, a memory 32 for storing turbulence data and processing instructions, a processor 34 for executing the instructions, and/or a display for displaying turbulence data or maps. Communication devices 30 may be carried on board an airplane by users or may form an integral part of the airplane in embedded communication systems on board the aircrafts. Communication devices 30 may include, for example, a hand-held mobile device or user equipment, such as a tablet PC held by a user 50 (e.g., a pilot holding or mounting the device on a dashboard). Communication devices 30 may additionally or alternatively be part of an embedded aircraft communication system in one or more of airplanes 10A-10F. Embedded aircraft communication systems may include multiple components (e.g., a transponder such as a mode C transponder or a mode S transponder, Universal Access Transceiver (UAT), memory, processor, display, weather radar, and the like) that may be packed into one housing or embedded in several different locations in the interior or exterior of the airplane.

Communication devices 30 such as hand-held user equipment may communicate via a Wi-Fi access point 40 that may be available continuously or intermittently during a flight of airplane 10A (or after the flight when the plane has landed). Access point 40 may communicate with a communication satellite 20B which in turn transmits the data to a terrestrial station 80 which connect to a remote server 100 over network 90 which may be, but not necessarily, the Internet. Additionally or alternately, communication devices 30 such as transponders embedded in embedded airplane communication systems may transmit turbulence data to ground control devices via radio or satellite. Turbulence data may be transmitted over these communication channels, for example, periodically, when there is a threshold change in detected turbulence values, and/or, if communication is temporarily unavailable, upon reestablishing connectivity.

While most airplanes 10A-10E communicate via a communication satellite 20A, some airplanes such as 10F may communicate (possibly using an inter-airplane communication system) via another airplane 10E which serves as a network node between airplane 10F and communication satellite 20A. Additionally, some communication devices 33, 35, and 37 may be located remotely outside the aircrafts, either as stationary sources of data or terminals (e.g., weather stations, airline operation terminals and/or ground control terminals) on which data is displayed. In some embodiments, turbulence data may be obtained, either manually or automatically, from communication devices 33, 35, and/or 37, for example, as third party sources other than the on-flight communication devices.

Remote server 100 may include a memory 102 or database 110 for storing turbulence data and processing instructions and a processor 104 for executing the instructions. Remote server 100 may be configured to receive the turbulence data from communication devices 30 on board airplanes 10A-10F over the communication channel. Remote server 100 may generate and later update a tempo-spatial turbulence database 110 by super-positioning (or mapping) the turbulence data received from the plurality of communication devices 30 onto a single tempo-spatial frame of reference. Turbulence data may be represented, for example, by values identifying intensity, source of data (manual or automatic), time, and further metadata describing the turbulence data. In some embodiments, each turbulence data sample recorded by communication devices 30 and/or received by remote server 100 may be indexed or identified by coordinates of position and time at which the data was recorded. For example, database 110 may store information representing a four-dimensional data array which maps global positioning system geographic coordinates (x, y), altitude (z), and time (t) into turbulence data. Additionally or alternatively, communication devices 30 may record and remote server 100 may receive a predefined flight trajectory, for example, for each distinct linear or curvilinear flight path with a constant velocity and/or acceleration, and a time at which each record was recorded, from which remote server 100 may calculate the position of each turbulence data sample. Remote server 100 may accumulate and combine readings from different trajectories and from different airplanes, for example, by rotating the axes of each sample set according to each distinct trajectory with respect to a common set of coordinate axes to fit together in a turbulence map or graph.

Remote server 100 may then distribute the accumulated turbulence data stored on the tempo-spatial database 110 to communication devices 30. The distributed data may be provided in various forms of processing. In one embodiment, remote server 100 may distribute an entire set of turbulence data, for example, accumulated from communication devices 30 on all available airplanes 10A-10F or for all available areas, times, and/or altitude ranges. In another embodiment, remote server 100 may only distribute a subset of the turbulence data stored on the database 110, for example, for a subset of airplanes 10A-10F, areas, times, and/or altitude ranges, responsive to a specified request made by one or more communication devices 30, or for only new or changes in turbulence data values. For example, remote server 100 may distribute the subset of turbulence data along the route of the airplane in which the device is located (e.g., which may be predefined and/or updated automatically when rerouted). In other embodiments, remote server 100 may distribute raw turbulence data from other communication devices to communication devices 30, which may then accumulate the received turbulence data with its own stored turbulence data locally. An example of the data structure for storing the turbulence data and a visual representation thereof will be described in further details hereinafter.

Data may be transmitted securely between communication devices 30, access points 40, satellites 20A-20B and/or terrestrial station 80, for example, using data authentication or encryption mechanisms at the sending and/or receiving device, such as, for example, password-protected logins, public and private keys, encryption functions, digital signatures, digital certificates, firewalls or other security mechanisms. In one embodiment, turbulence data may be transmitted in a secure manner using Hypertext Transfer Protocol Secure (HTTPS) or secure sockets layer (SSL) communication (e.g., where HTTPS communication is not available). Upon starting an application, a processor (e.g., processor 34 or 104) may request and receive user login credentials, such as, a user name and password, entered by user 50. In some embodiments, a memory (e.g., memory 32, 102 or database 110) may store a list of one or more user identifications (IDs), device IDs or flight IDs that a processor (e.g., processor 34 or 104) pre-registered as allowed or barred. In some embodiments, the processor may request and receive a user's flight information and, e.g., together with the user's user name and password, may request verification of the user's credentials by an airline company and/or specific details for the flight, including a route and waypoints, against which the user's position data may be checked during the flight.

Figure 3A:
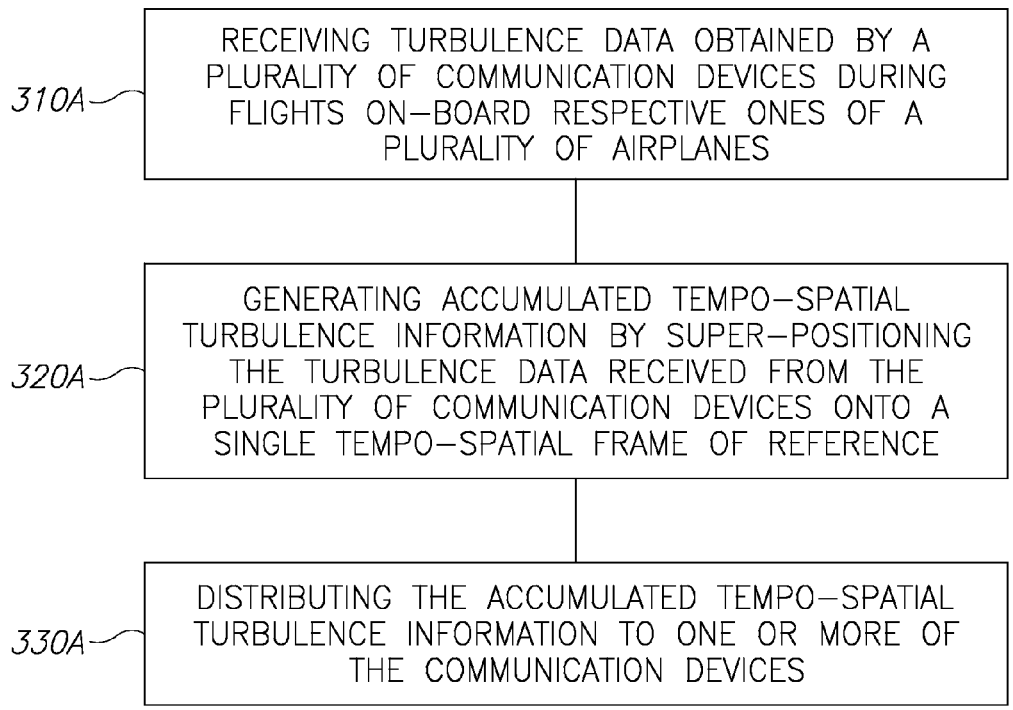
FIG. 3A is a flowchart diagram illustrating a method for monitoring turbulence data in accordance with embodiments of the present invention.

FIG. 3A is a flowchart diagram illustrating a method 300A for monitoring turbulence data in accordance with embodiments of the present invention. Method 300A may be executed using a processor (e.g., server processor 104 of FIG. 2) that is in communication with, and located remotely from, a plurality of in-flight communication devices (e.g., communication devices 30 of FIG. 2).

In operation 310A, a processor (e.g., processor 104 of FIG. 2) may receive turbulence data obtained by a plurality of communication devices (e.g., communication devices 30 of FIG. 2) during flights on-board respective ones of a plurality of airplanes (e.g., airplanes 10A-10F of FIG. 2). Each of the plurality of communication devices may independently receive or record turbulence affecting the airplane in-flight. The communication device may either receive the turbulence data manually, via an input from a human user or automatically, by measuring the temporal acceleration forces applied to the sensors of the communication device.

In operation 320A, the processor may generate accumulated tempo-spatial turbulence information by super-positioning the turbulence data received from the plurality of communication devices onto a single tempo-spatial frame of reference.

In operation 330A, the processor may distribute the accumulated tempo-spatial turbulence data information to one or more of the communication devices.

According to some embodiments of the present invention, the processor may distribute the accumulated turbulence data to be displayed on communication devices. In some embodiments, the processor may divide and distribute flight and turbulence data into segments of time. Each segment may represent a single turbulence level (e.g., in a range of 0-5) and the processor may create a new segment if the processor detects a change in the turbulence level and/or a change in the course/bearing of the flight by more than a predetermined threshold amount (such as, 2 degrees). Each segment may include one or more of: start and end coordinates, start and end altitude, start and end timestamp, and bearing. A segment may have a maximum duration (such as, 15 minutes), for example, to enable the processor to respond to queries that are time based, such as "show turbulence from the past 45 minutes."

According to some embodiments of the present invention, the turbulence data may include, for example, intensity level of the turbulence, geographic or spatial coordinates of the turbulence, trajectory of the flight, altitude of the turbulence and/or time of the turbulence.

Figure 3B:
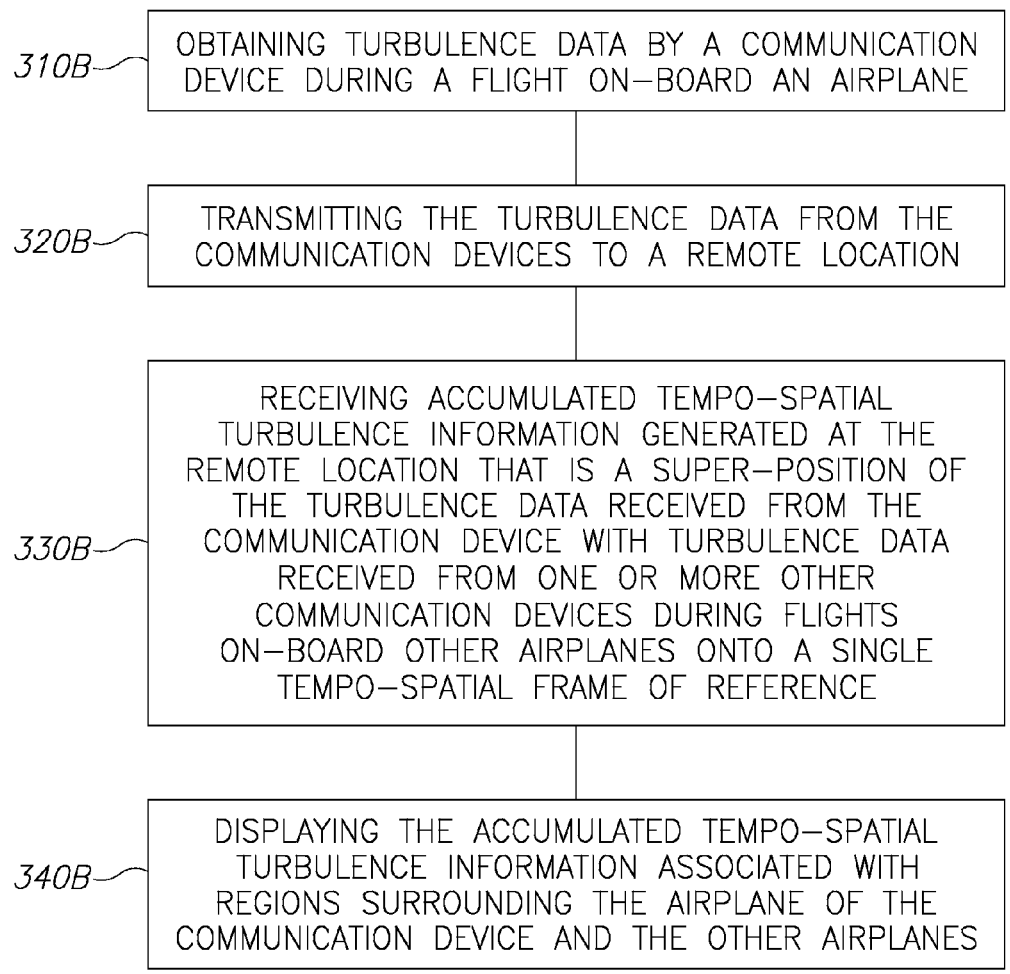
FIG. 3B is a flowchart diagram illustrating a method for obtaining and communicating turbulence data in accordance with embodiments of the present invention.

FIG. 3B is a flowchart diagram illustrating a method 300B for obtaining and communicating turbulence data in accordance with embodiments of the present invention. Method 300B may be executed using a processor (e.g., communication device processor 34 of FIG. 2) that is in communication with, and located remotely from, a centralized processing and distribution location (e.g., server 100 of FIG. 2).

In operation 310B, a processor (e.g., communication device processor 34 of FIG. 2) may obtain turbulence data during a flight on-board an airplane (e.g., airplane 10A of FIG. 2). Each of a plurality of communication devices may independently receive or record turbulence data while the airplane is in-flight. The communication device may either receive the turbulence data manually, via input from a human user or automatically, by measuring the temporal acceleration forces applied to the sensors of the communication device.

In operation 320B, a communication device (e.g., communication device 30 of FIG. 2) may transmit the turbulence data to a remote location (e.g., server 100 of FIG. 2).

In operation 330B, the communication devices (e.g., communication device 30 of FIG. 2) may receive accumulated tempo-spatial turbulence information generated at the remote location (e.g., server 100 of FIG. 2). The accumulated tempo-spatial turbulence information may be a super-position of the turbulence data received from the communication device with turbulence data received from one or more other communication devices during flights on-board other airplanes (e.g., airplanes 10B-10F of FIG. 2) onto a single tempo-spatial frame of reference (e.g., as generated in operation 320A of FIG. 3A).

In operation 340B, a display (e.g., of communication device 30 of FIG. 2) may display the accumulated tempo-spatial turbulence information associated with regions surrounding or along the route of the airplane of the communication device and/or the other airplanes.

Figure 4:
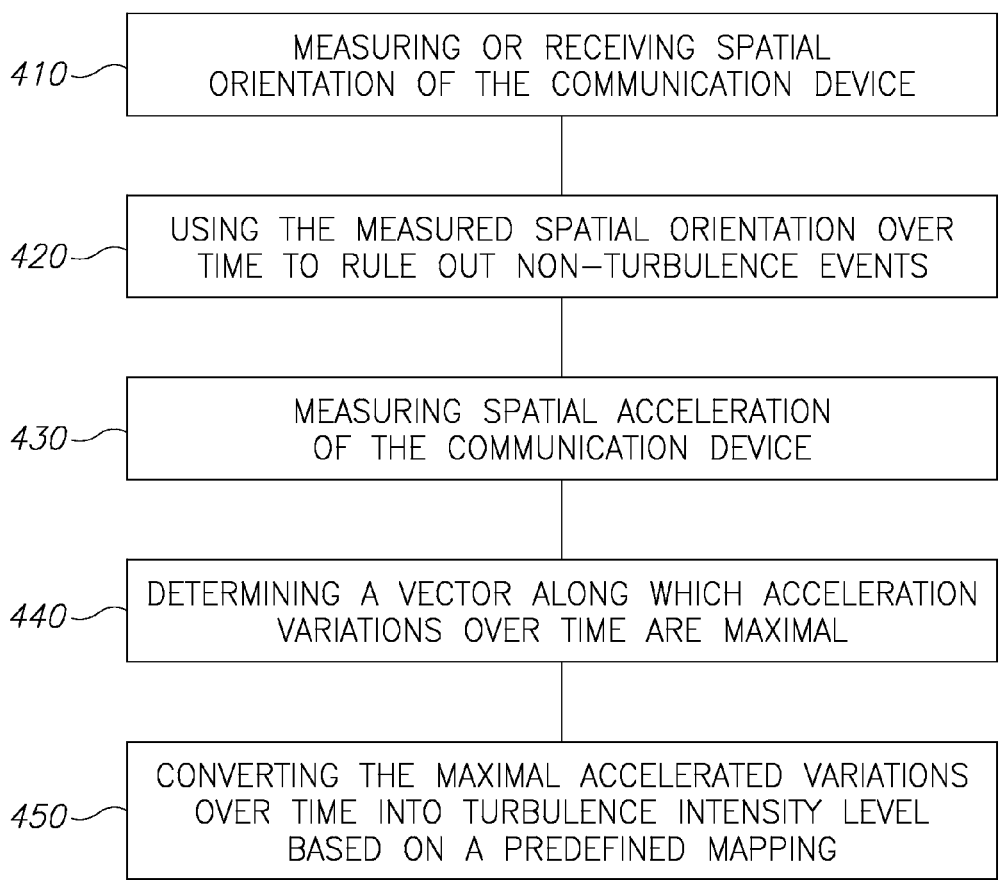
FIG. 4 is a flowchart diagram illustrating a conversion process in accordance with embodiments of the present invention.

According to some embodiments of the present invention, the turbulence data may be generated, for example, by obtaining spatial acceleration data associated with the communication devices, respectively, and converting the spatial acceleration data into turbulence data, based on a conversion process described in reference to FIG. 4.

FIG. 4 is a flowchart diagram illustrating a conversion process 400 in which kinematic data such as acceleration is converted to turbulence values or levels, in accordance with embodiments of the present invention. Process 400 may be executed using a processor (e.g., server processor 104 and/or client device processor 34 of FIG. 2).

In operation 410, a processor (e.g., communication device processor 34 of FIG. 2) may measure or a processor (e.g., server processor 104 of FIG. 2) may receive spatial orientation data of a communication device (e.g., communication device 30 of FIG. 2).

In operation 420, the processor may use the measured spatial orientation data over time to identify turbulence events or rule out non-turbulence events, for example, movement of the communication device independent of and/or relative to the airplane.

In operation 430, the processor may measure spatial acceleration of the communication device during turbulence events.

In operation 440, the processor may determine a vector along which acceleration variations over time are maximal.

In operation 450, the processor may convert the maximal accelerated variations over time into turbulence intensity level based on a predefined mapping.

According to some embodiments of the present invention, the determining of a vector along which variations of the acceleration are maximal (operation 440) may be carried out in order to detect the full effect of the turbulence since turbulence events are characterized with chaotic variations of acceleration, and it may be desirable to detect the full magnitude of the turbulence so as to associate the correct intensity level to the transmitted turbulence data (operation 450). In order to achieve that, the conversion process may include measuring or receiving the spatial orientations of the communication devices (operation 410), respectively, and determining the acceleration variations given the measured spatial orientation (operation 430). It may be the case that the turbulence events are vertical and so some of the orientation measurements are directed at locating the acceleration components along the vertical axis of the aircraft.

According to some embodiments of the present invention, one objective of using the measured spatial orientation over time is to identify turbulence events or rule out non-turbulence events (operation 420). Changes of orientation during non-turbulence events may be due to a user moving the communication device independently of the movement of the airplane. These movements typically have their own motion pattern and their effect may be filtered out from the overall change in acceleration, to provide a correct value of turbulence. In some embodiments, a processor (e.g., communication device processor 34 or remote server processor 104 of FIG. 2) may identify communication device (e.g., communication device 30 of FIG. 2) movements relative to the airplane by measuring rapid changes in device orientation. At any given moment, the processor may request and/or receive information about its orientation in space, for example, including angles along its three axes. When the communication device is at rest (identified by very small changes in the acceleration along all of it axes), the processor measures the angles along its three axes. When the processor identifies that there is a change in one of the angles, it starts measuring the time. When the change stops, the processor checks if one of the angles has changed by more than a predetermined threshold configured value. If the change is higher, the processor checks the speed of the change by measuring the time difference. If the speed is higher than the configured value, the processor may determine that the change is caused by movement of the communication device and not the airplane and may be eliminated as a non-turbulent event. After a non-turbulent event is detected, if the processor does not detect an ongoing orientation change for at least a predetermined amount of time, the processor may determine that the communication device is at rest again. The processor may reset all turbulence data to no turbulence in a preconfigured period before an identification of a first movement. The processor may also reset all samples of turbulence data after the end of the movement to no turbulence for a preconfigured period. In one example, a communication device may be lying flat causing the processor to detect angles of zero along the X and the Y axes. If a user picks up the communication device and looks at it, this movement may change the angles from zero to about 30-40 degrees along the Y axis over the course of approximately 1 or 2 seconds. The processor identifies the rapid change in angle as a device motion event, not a turbulent event. After the device is at rest for a predetermined threshold of time (e.g., 3 seconds), the processor may clear or cancel turbulence data recorded over a predetermined past time period (e.g., 3 minutes) and/or future time period (e.g., 1 minute). In some cases, for example, if the predetermined past time period is greater than the periodic transmission interval, the communication device may transmit non-turbulent motion data to the remote server before it is identified. The processor may then send the remote server a cancellation signal to delete or ignore non-turbulence data segments. In some embodiments, the processor may recognize when the device is fixed or mounted to the airplane (e.g., releasably secured to a dashboard mount in the cockpit) and may deactivate or skip non-turbulent motion detection processes.

According to some embodiments of the present invention, obtaining the turbulence data may be executed responsive to manual input by respective users of the communication devices. In such embodiments, a user (e.g., a pilot) may report turbulence as they experience it. In further embodiments, the manual input may include additional data relating to potential flight disturbances other than turbulence, such as cloud coverage or wind shear.

Figure 5:
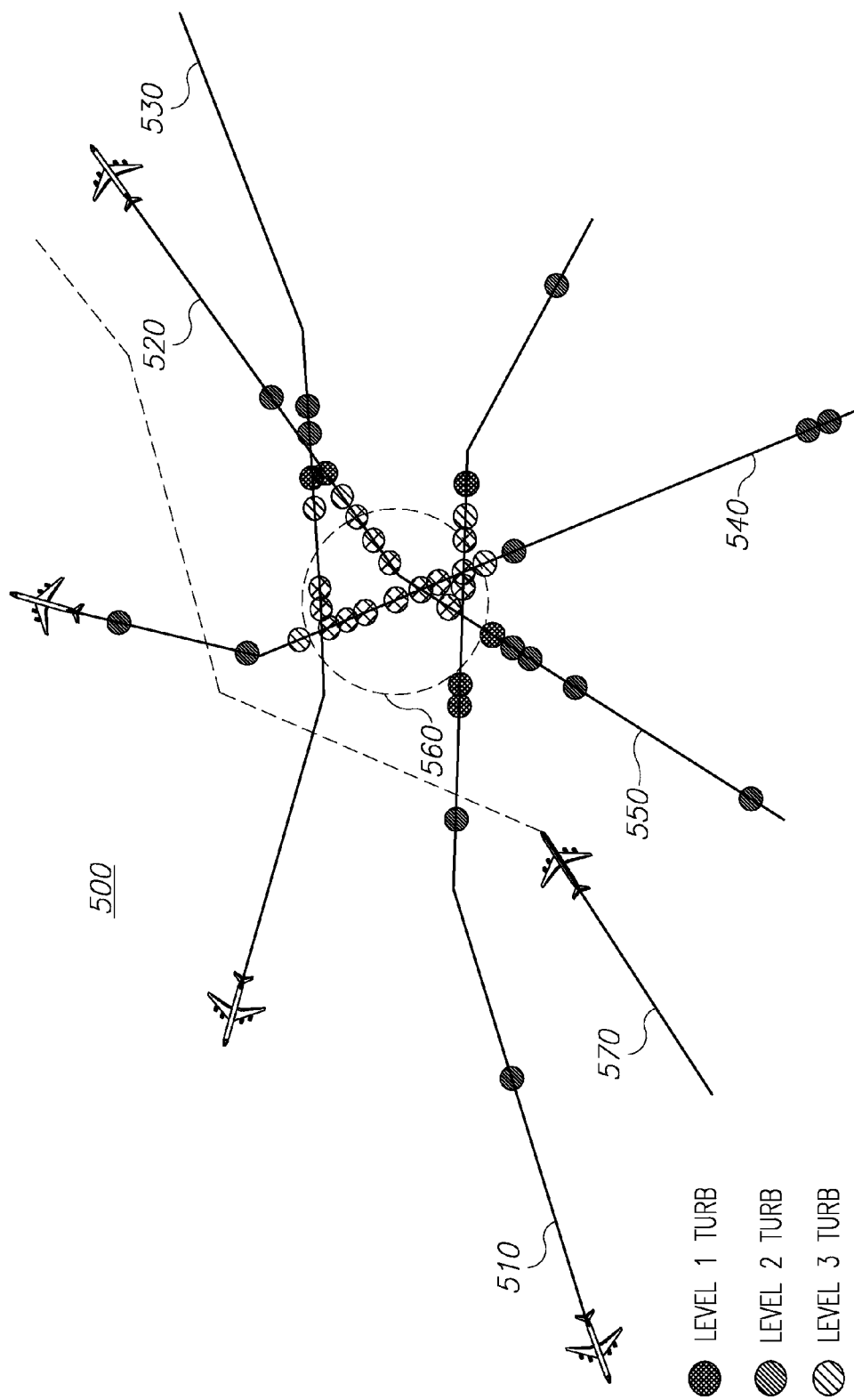
FIG. 5 is a schematic diagram illustrating a plurality of turbulence data samples obtained during several flight routes used to derive coverage of a specific area of turbulence data in accordance with embodiments of the present invention.

FIG. 5 is a schematic diagram illustrating a plurality of turbulence data samples obtained during several flight routes used to derive turbulence data covering a specific area in accordance with embodiments of the present invention. FIG. 5 shows a map 500 of five different flight routes 510-550 representing flights during which turbulence data was collected according to embodiments described herein. Region 560 shows turbulence data accumulated from the various flight routes 510-550 so as to provide turbulence data over a larger area than would be provided using a single flight route. In the example of FIG. 5, region 560 contains turbulence data samples indicating "level 4" turbulence. The turbulence data regarding region 560 may be used by a pilot of the airplane on route 570 (solid line) to divert to an alternative route (broken line) and thus avoid turbulent area 560.

In some embodiments, turbulence data from various flights may be used to validate the turbulence samples coming from proximal locations and sample times of the data. It should be understood that a plurality of flights may be used to collect turbulence data, which is used to update the database at the remote server, for both accumulating and further analysis as will be explained below.

Figure 6:
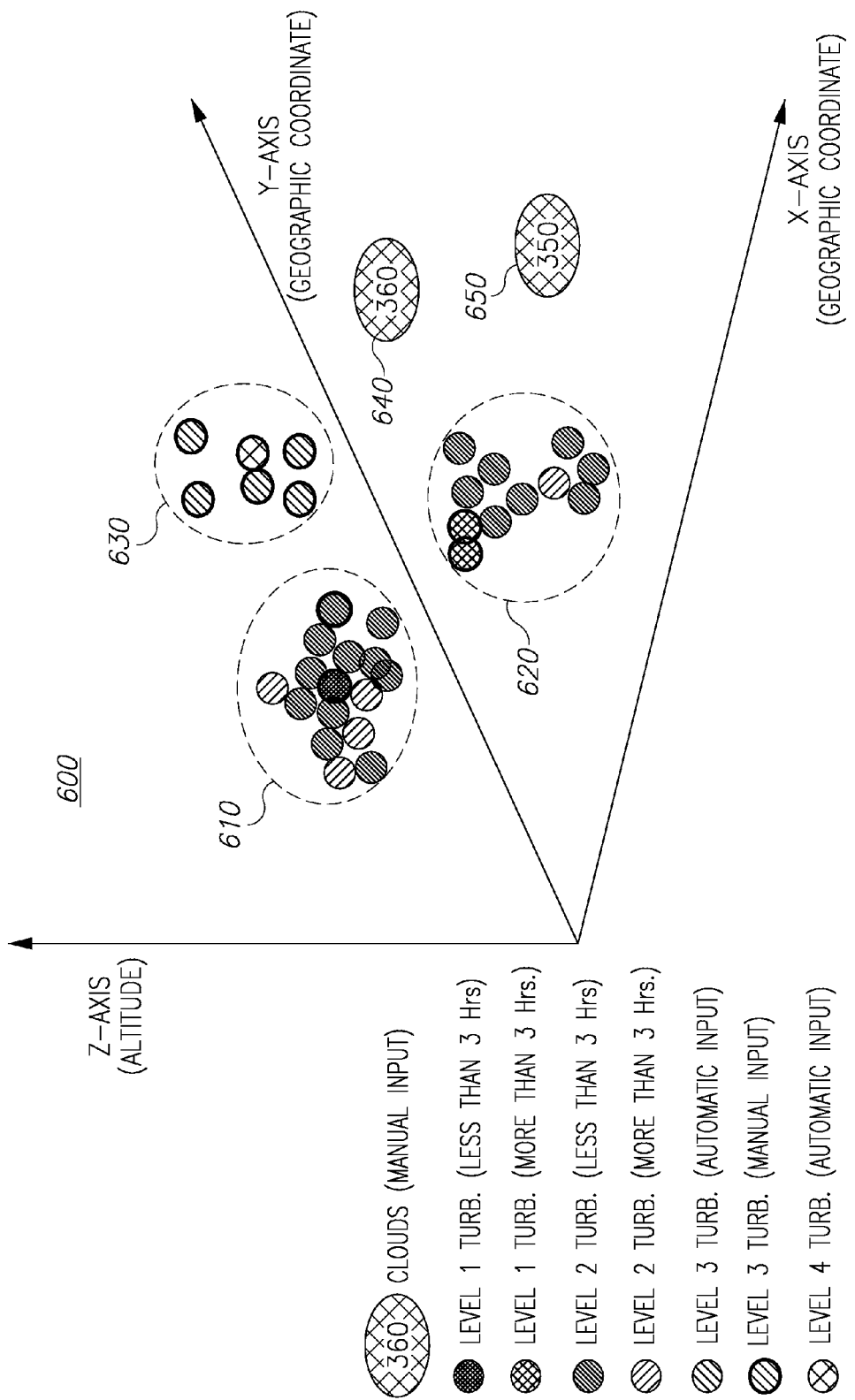
FIG. 6 is a graph diagram for super-positioning turbulence data received from a plurality of communication devices in accordance with embodiments of the present invention.

FIG. 6 is a graph diagram 600 for super-positioning turbulence data received from a plurality of communication devices in accordance with embodiments of the present invention. Graph 600 may represent data in the form of a three dimensional array with axes x and y representing latitude and longitude geographic coordinates and the z axis representing altitude. As turbulence data is received, the data may be mapped onto a common frame of reference, possibly in clusters of samples 610, 620, and 630 each representing turbulence data from a plurality of flights proximal to each other either in space or in time. Each sample is associated with several attributes such as turbulence intensity, altitude, and time of collection. Other non-turbulence data, such as, cloud coverage or visibility 640 and 650 may be stored. The legend at the lower left corner of FIG. 6 shows example and non-limiting attributes that may be associated with the turbulence data samples.

Figure 7:
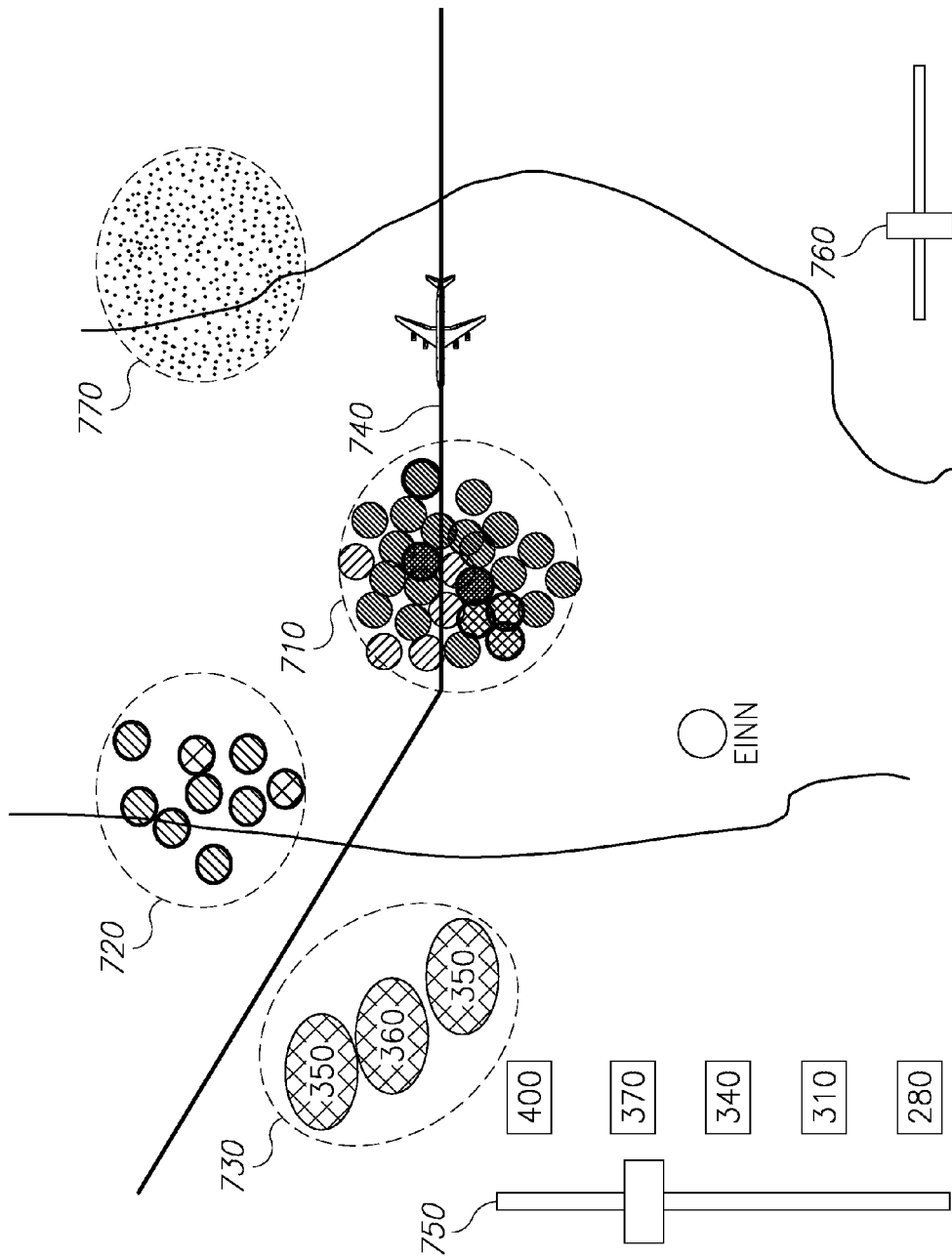
FIG. 7 is map diagram illustrating a visual representation of turbulence data in accordance with embodiments of the present invention.

FIG. 7 is a map diagram illustrating a visual representation of turbulence data in accordance with embodiments of the present invention. The map diagram may be generated based on the data distributed by a remote server (e.g., server 100 of FIG. 2) and may be displayed on one or more communication device (e.g., communication devices 30 of FIG. 2). In the example of FIG. 7, flight route 740 is shown as entering a cluster of visual indicators 710 all of low level turbulence while avoiding a cluster 720 of high level turbulence. A volcanic ash area 770, possibly identified by third party sources, and cloud coverage 730, with their respective altitude indicated, may also be displayed.

According to some embodiments of the present invention, the visual representation may include a plurality of indicators superimposed on a map according to the respective locations at which the turbulence data was obtained or recorded.

According to some embodiments of the present invention, the indicators visually distinguish between various levels of turbulence intensity. This may be implemented, as shown here by using a predefined color, pattern or icon scheme. The same scheme may be used for all communication devices or different schemes may be used or changed for different respective communication devices.

According to some embodiments of the present invention, the indicators may further visually distinguish between at least one of: sample time of the turbulence data, and whether or not the turbulence data was obtained manually or by measuring acceleration of the respective communication devices.

According to some embodiments of the present invention, the visual representation may be altered responsive to user selection, for example, to only show the indicators of a specified altitude range, within a specified radius or flight route, or within a specified period of time.

According to some embodiments of the present invention, the visual representation may be altered, possibly using a graphical user interface (GUI) responsive to user selection, to only show the indicators of a specified level or range of turbulence level, or a specified altitude range (a non-limiting example may include GUI bar 750) or a specified time range (a non-limiting example may include GUI bar 760).

Although the network connection between the communication devices and the remote server may be continuous, according to some embodiments of the present invention, in a case that at least some of communication devices cannot temporarily establish a communication channel with the remote location, or in a case that no communication is available throughout the entire flight, the transmitting of the turbulence data by the at least some of communication devices may be delayed to when the communication channel becomes available (e.g., when an airplane access point is activated in flight or after landing upon gaining access to a communication network). At that time, turbulence data from the entire flight or only time periods when a connection was unavailable, may be transmitted to the server. The server may apply the past turbulence data to show turbulence in areas along flight paths where other airplanes are currently or are projected to pass.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the invention.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A method comprising:
   receiving turbulence data including multiple different turbulence levels within each of one or more regions of a turbulence map obtained by a plurality of communication devices during flights on-board respective ones of a plurality of airplanes;
   wherein the received turbulence data is obtained by: obtaining spatial acceleration data affecting each of the plurality of communication devices and converting the spatial acceleration data into turbulence data based on a conversion process;
   generating turbulence map data including accumulated tempo-spatial turbulence information of a single turbulence level for each of the one or more regions by super-positioning onto a single tempo-spatial frame of reference the turbulence data including the multiple different turbulence levels within each of the one or more regions received from the plurality of communication devices;
   distributing the turbulence map data including the accumulated tempo-spatial turbulence information to one or more of the plurality of communication devices; and
   displaying the turbulence map data.

2. The method according to claim 1, wherein the turbulence data is received from one or more hand-held user communication devices.

3. The method according to claim 1, wherein the turbulence data is received from one or more embedded airplane communication devices.

4. The method according to claim 1, wherein the turbulence data is received from at least one hand-held user communication device and at least one embedded airplane communication device.

5. The method according to claim 1, wherein the turbulence data comprises: intensity level of the turbulence; geographic coordinates of the turbulence; altitude of the turbulence; and time of the turbulence.

6. The method according to claim 1, wherein the conversion process comprises determining a vector along which variations of the acceleration are maximal and measuring said variations over time.

7. The method according to claim 1, wherein the conversion process comprises obtaining a spatial orientation of each of the plurality of communication devices and determining acceleration variations for each of the plurality of communication devices given the measured spatial orientation thereof.

8. The method according to claim 7, further comprising: using the measured spatial orientation over time to rule out non-turbulence events.

9. The method according to claim 1, wherein the obtaining of the turbulence data is carried out responsive to manual input by respective users of one or more of: the plurality of communication devices on-board the airplanes and devices located remotely from the airplanes.

10. A method comprising:
    obtaining turbulence data including one or more turbulence levels within one or more regions of a turbulence map obtained by a communication device during a flight on-board an airplane;
    wherein obtaining turbulence data comprises: obtaining spatial acceleration data affecting the communication device and converting the spatial acceleration data into turbulence data based on a conversion process;
    transmitting the turbulence data from the communication device to a remote location;
    receiving turbulence map data including accumulated tempo-spatial turbulence information of a single turbulence level for each of the one or more regions generated at the remote location by super-positioning onto a single tempo-spatial frame of reference the turbulence data including the one or more turbulence levels within the one or more regions received from the communication device with turbulence data including one or more different turbulence levels within the one or more regions received from one or more other communication devices during flights on-board other airplanes;
    displaying the accumulated tempo-spatial turbulence information associated with the one or more regions surrounding the airplane of the communication device and the other airplanes.

11. The method according to claim 10, wherein the communication device on-board the airplane and the one or more other communication devices on-board other airplanes include one or more hand-held user communication devices or embedded airplane communication devices.

12. The method according to claim 10, wherein the accumulated tempo-spatial turbulence information is displayed in a visual representation comprising a plurality of indicators superimposed on a map according to the respective locations at which the turbulence data was obtained.

13. The method according to claim 12, wherein the indicators visually distinguish between different levels of turbulence intensity.

14. The method according to claim 12, wherein the indicators visually distinguish between at least one of: sample time of the turbulence data, and whether or not the turbulence data was obtained manually via user input or automatically via measuring acceleration of the respective communication devices.

15. The method according to claim 12, wherein the visual representation is altered responsive to user selection to only show the visual indicators of at least one of: a specified altitude range, a specified time range, and a specified range of turbulence level.

16. The method according to claim 10, wherein the transmitting of the turbulence data by the communication device is delayed to whenever a communication channel becomes available.

17. A device comprising:
    a processor;
    memory, and
    one or more instructions stored in the memory and executable by the processor, which, when executed, configure the processor to:
    receive turbulence data including multiple different turbulence levels within each of one or more regions of a turbulence map obtained by a plurality of communication devices during flights on-board respective ones of a plurality of airplanes;
wherein the processor is configured to receive turbulence data by: obtaining spatial acceleration data affecting each of the plurality of communication devices and converting the spatial acceleration data into turbulence data based on a conversion process;
generate turbulence map data including accumulated tempo-spatial turbulence information of a single turbulence level for each of the one or more regions by super-positioning onto a single tempo-spatial frame of reference the turbulence data including the multiple different turbulence levels within each of the one or more regions received from the plurality of communication devices; and
distribute the turbulence map data including the accumulated tempo-spatial turbulence information to one or more of the plurality of communication devices.

18. The device according to claim 17, wherein the plurality of communication devices include one or more hand-held user communication devices or embedded airplane communication devices.

19. The device according to claim 17, wherein the turbulence data comprises: intensity level of the turbulence; geographic coordinates of the turbulence; altitude of the turbulence; and time of the turbulence.

20. The device according to claim 17, wherein the processor is configured to execute the conversion process by determining a vector along which variations of acceleration are maximal and measuring said variations over time.

21. The device according to claim 17, wherein the processor is configured to execute the conversion process by obtaining a spatial orientation of each of the plurality of communication devices and determining acceleration variations for each of the plurality of communication devices given the measured spatial orientation thereof.

22. The device according to claim 21, wherein the processor is further configured to use the measured spatial orientation over time to rule out non-turbulence events.

23. The device according to claim 17, wherein the processor is configured to obtain the turbulence data responsive to manual input by respective users of: one or more of the plurality of communication devices on-board the airplanes and devices located remotely from the airplanes.

24. A communication device comprising:
a processor;
memory, and
one or more instructions stored in the memory and executable by the processor, which, when executed, configure the processor to:
obtain turbulence data including one or more turbulence levels within one or more regions of a turbulence map obtained during a flight on-board an airplane;
wherein the processor is configured to obtain turbulence data by: obtaining spatial acceleration data affecting each of the plurality of communication devices and converting the spatial acceleration data into turbulence data based on a conversion process;
transmit the turbulence data from the communication device to a remote location;
receive turbulence map data including accumulated tempo-spatial turbulence information of a single turbulence level for each of the one or more regions generated at the remote location by super-positioning onto a single tempo-spatial frame of reference the turbulence data including the one or more turbulence levels within the one or more regions received from the communication device with turbulence data including one or more different turbulence levels within the one or more regions received from one or more other communication devices during flights on-board other airplanes; and
display the accumulated tempo-spatial turbulence information associated with the one or more regions surrounding the airplane of the communication device and the other airplanes.

25. The communication device according to claim 24, wherein the communication device on-board the airplane and the one or more other communication devices on-board other airplanes include one or more hand-held user communication devices.

26. The communication device according to claim 24, wherein the communication device on-board the airplane and the one or more other communication devices on-board other airplanes include one or more embedded airplane communication devices.

27. The communication device according to claim 24, wherein the communication device on-board the airplane and the one or more other communication devices on-board other airplanes include at least one hand-held user communication device and at least one embedded airplane communication device.

28. The communication device according to claim 24, wherein the accumulated tempo-spatial turbulence information is displayed in a visual representation comprising a plurality of indicators superimposed on a map according to the respective locations at which the turbulence data was obtained.

* * * * *